(12) United States Patent
Tsukizaki (10) Patent No.: US 11,619,300 B2
(45) Date of Patent: Apr. 4, 2023

(54) VEHICLE TRANSMISSION

(71) Applicant: Nissan Motor Co., Ltd., Yokohama (JP)

(72) Inventor: Atsushi Tsukizaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/615,601

(22) PCT Filed: Jun. 26, 2019

(86) PCT No.: PCT/IB2019/000643
§ 371 (c)(1),
(2) Date: Dec. 1, 2021

(87) PCT Pub. No.: WO2020/260915
PCT Pub. Date: Dec. 30, 2020

(65) Prior Publication Data
US 2022/0196146 A1 Jun. 23, 2022

(51) Int. Cl.
*F16H 61/18* (2006.01)
*F16D 11/04* (2006.01)
*F16H 3/091* (2006.01)

(52) U.S. Cl.
CPC ............. *F16H 61/18* (2013.01); *F16D 11/04* (2013.01); *F16H 3/091* (2013.01)

(58) Field of Classification Search
CPC .......... F16H 61/18; F16H 3/091; F16H 63/30; F16H 2003/0811; F16H 2061/047; F16H 2063/3093; F16H 2200/0021; F16H 2200/0034; F16H 3/089; F16D 11/04; F16D 2011/002; F16D 2011/006; B60Y 2200/91; Y02T 10/62
USPC .......................................... 74/473.21, 473.22
See application file for complete search history.

(56) References Cited

U.S. PATENT DOCUMENTS

| | | | | |
|---|---|---|---|---|
| 4,455,884 A * | 6/1984 | Tsuruta | ................... | F16H 63/18 74/473.28 |
| 10,807,457 B2 * | 10/2020 | Ogino | ..................... | B60L 50/16 |
| 2012/0240702 A1 * | 9/2012 | Tokito | ..................... | F16H 59/70 74/337.5 |
| 2017/0175890 A1 * | 6/2017 | Esser | ...................... | F16H 63/04 |

FOREIGN PATENT DOCUMENTS

EP 3 453 548 A1 3/2019
JP 2017-222197 A 12/2017

* cited by examiner

*Primary Examiner* — Victor L Macarthur
(74) *Attorney, Agent, or Firm* — Global IP Counselors, LLP (57) ABSTRACT

An engine transmission is provided with an interference member that is configured to interfere with one of a low-gear clutch sleeve and a high-gear clutch sleeve so that when one of the low-gear clutch sleeve and the high-gear clutch sleeve is at an engagement position, the other one of the low-gear clutch sleeve and the high-gear clutch sleeve cannot move to an engagement position.

8 Claims, 7 Drawing Sheets

VEHICLE TRANSMISSION

CROSS-REFERENCE TO RELATED APPLICATIONS

This application is a U.S. national stage application of International Application No. PCT/IB2019/000643, filed on Jun. 26, 2019.

BACKGROUND

Technical Field

The present invention relates to a vehicle transmission.

Background Information

Japanese Laid-open Patent Application No. 2017-222197 (Patent Document 1) discloses a series-scheme hybrid vehicle provided with an engine and an electric motor as sources of motive power for the vehicle. An output of the engine is transfer to a vehicle driveshaft via a two-stage transmission having a low-gear stage and a high-gear stage.

SUMMARY

However, in the prior art mentioned above, a switch between two gear stages is performed by selectively engaging two dog clutches that are independent from each other. Therefore, there has been a concern that, when an actuator has erroneously actuated, unexpected interlocking will occur due to simultaneous engagement of the two dog clutches and vehicle behavior will suddenly change. It is an object of the present invention to provide a vehicle transmission in which it is possible to suppress incidence of unexpected interlocking.

The present invention is provided with an interference member that interferes so that, when one of a first clutch sleeve and a second clutch sleeve is at an engagement position, the other cannot move to an engagement position.

This makes it possible to suppress incidence of unexpected interlocking in the present invention.

BRIEF DESCRIPTION OF THE DRAWINGS

Referring now to the attached drawings which form a part of this original disclosure.

DETAILED DESCRIPTION OF EMBODIMENTS

An embodiment of the present invention will now be described with reference to the drawings. In the description, the same elements have been designated by the same reference numerals, and redundant explanations have been omitted.

First Embodiment

Figure 1:
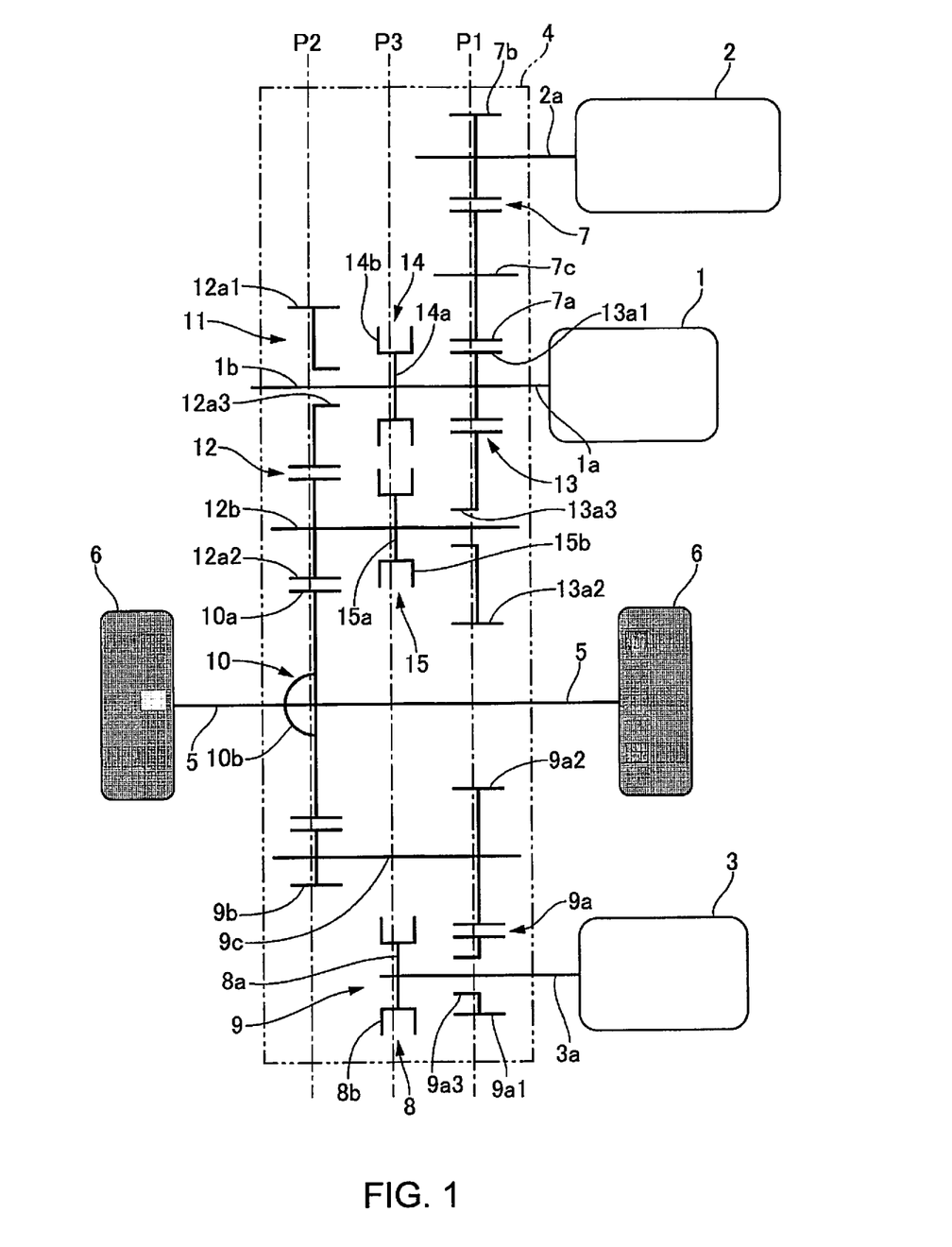
FIG. 1 is a schematic diagram showing a drive system of a vehicle according to the first embodiment.

FIG. 1 is a schematic diagram showing a drive system of a vehicle according to a first embodiment. The vehicle in the first embodiment is a hybrid vehicle that can travel by switching between a series scheme and a parallel scheme. The vehicle is provided with an engine 1, an electric-power-generating motor 2, a travel motor 3, a gear box 4, a driveshaft 5, and drive wheels 6. In the gear box 4, a plurality of gear trains (electric-power-generating-motor gear train 7, a travel-motor reduction mechanism 9, a differential 10, and an engine transmission mechanism 11) are accommodated inside a casing. A crankshaft 1$a$ of the engine 1 is provided integrally with an input shaft (first shaft) 1$b$ accommodated in the gear box 4. The input shaft 1$b$ is connected to a motor shaft 2$a$ of the electric-power-generating motor 2 via the electric-power-generating-motor gear train 7. The electric-power-generating-motor gear train 7 has two gears 7$a$, 7$b$ that mesh with each other. The drive gear 7$a$ is secured to a rotating shaft 7$c$ and meshes with a drive gear (third gear) 13$a$1 that is secured to the input shaft 1$b$. The driven gear 7$b$ is secured to the motor shaft 2$a$.

A motor shaft 3$a$ of the travel motor 3 can be coupled with a drive gear 9$a$1 of the travel-motor reduction mechanism 9 via a motor-travel clutch 8 accommodated in the gear box 4. The motor-travel clutch 8 is a dog clutch that is engaged by a meshing stroke in a rotation-synchronized state. The motor-travel clutch 8 has a hub 8$a$ and a motor clutch sleeve 8$b$. The hub 8$a$ is secured to the motor shaft 3$a$. The motor clutch sleeve 8$b$ is joined to the hub 8$a$ so as to be incapable of rotating and so as to be capable of sliding in an axis direction of the motor shaft 3$a$ (referred to as the axial direction below). Spline teeth (not shown) that are capable of meshing with dog teeth (not shown) of a dog gear 9$a$3 secured to the drive gear 9$a$1 are provided on a diameter-direction inner side of the motor clutch sleeve 8$b$. When the motor clutch sleeve 8$b$ is at a left-side engagement position (left), the spline teeth of the motor clutch sleeve 8$b$ and the dog teeth of the dog gear 9$a$3 mesh with each other, whereby the motor shaft 3$a$ and the drive gear 9$a$1 of the travel-motor reduction mechanism 9 are coupled. However, when the motor clutch sleeve 8$b$ is at a right-side release position (right), the spline teeth of the motor clutch sleeve 8$b$ and the dog teeth of the dog gear 9$a$3 come out of mesh, whereby the motor shaft 3$a$ and the drive gear 9$a$1 are uncoupled.

The travel-motor reduction mechanism 9 has a travel-motor gear train 9$a$ and a travel-motor final reduction gear 9$b$. The travel-motor gear train 9$a$ has two gears 9$a$1, 9$a$2 that mesh with each other. The drive gear 9$a$1 is a free-rotating gear that is rotatably supported on the motor shaft 3$a$. The driven gear 9$a$2 is secured to a rotating shaft 9$c$. The travel-motor final reduction gear 9$b$ is secured to the rotating shaft 9$c$. The travel-motor final reduction gear 9$b$ meshes with a ring gear 10$a$ of the differential 10. In addition to the ring gear 10$a$, the differential 10 is provided with a differential case 10$b$ having an actuating mechanism unit (not shown) in the interior thereof. Left/right side gears of the actuating mechanism unit are coupled with left/right driveshafts 5. The left/right driveshafts 5 are coupled with the drive wheels 6.

The engine transmission mechanism 11 is a vehicle transmission device configured to switch between a low-gear stage and a high-gear stage. The engine transmission mechanism 11 has a high-gear stage gear train 12, a low-gear stage gear train 13, a high-gear stage clutch 14, and a low-gear stage clutch 15. The high-gear stage gear train 12 has two gears 12$a$1, 12$a$2 that mesh with each other. The drive gear (first gear) 12$a$1 is a free-rotating gear that is rotatably supported on the input shaft 1$b$. The drive gear 12$a$1 can be coupled with the input shaft 1 $b$ via the high-gear stage clutch 14. The driven gear (second gear) 12$a$2 is secured to a countershaft (second shaft) 12$b$ and meshes with the ring gear 10$a$ of the differential 10. Specifically, the driven gear 12$a$2 additionally serves as a reduction small gear of a final reduction device (engine final reduction gear). The low-gear stage gear train 13 has two gears 13$a$1, 13$a$2 that mesh with each other. The driven gear (fourth gear) 13$a$2 is a free-rotating gear that is rotatably supported on the countershaft 12$b$. The driven gear 13$a$2 can be coupled with the countershaft 12$b$ via the low-gear stage clutch 15. The low-gear stage gear train 13 has a higher reduction ratio than does the high-gear stage gear train 12.

The high-gear stage clutch 14 is a dog clutch that is engaged by a meshing stroke in a rotation-synchronized state. The high-gear stage clutch 14 has a hub 14$a$ and a high-gear stage clutch sleeve (first clutch sleeve) 14$b$. The hub 14$a$ is secured to the input shaft 1$b$. The high-gear stage clutch sleeve 14$b$ is joined to the hub 14$a$ so as to be incapable of rotating and so as to be capable of sliding in the axial direction. Spline teeth (not shown) that are capable of meshing with dog teeth (not shown) of a dog gear (first dog gear) 12$a$3 secured to the drive gear 12$a$1 are provided on a diameter-direction inner side of the high-gear stage clutch sleeve 14$b$. When the high-gear stage clutch sleeve 14$b$ of the high-gear stage clutch 14 is at a left-side engagement position (left), the spline teeth of the high-gear stage clutch sleeve 14$b$ and the dog teeth of the dog gear 12$a$3 mesh with each other, whereby the drive gear 12$a$1 and the input shaft 1 $b$ are coupled. However, when the high-gear stage clutch sleeve 14$b$ is at a right-side release position (right), the spline teeth of the high-gear stage clutch sleeve 14$b$ and the dog teeth of the dog gear 12$a$3 come out of mesh, whereby the drive gear 12$a$1 and the input shaft 1$b$ are uncoupled.

The low-gear stage clutch 15 is a dog clutch that is engaged by a meshing stroke in a rotation-synchronized state. The low-gear stage clutch 15 has a hub 15$a$ and a low-gear stage clutch sleeve (second clutch sleeve) 15$b$. The hub 15$a$ is secured to the countershaft 12$b$. The low-gear stage clutch sleeve 15$b$ is joined to the hub 15$a$ so as to be incapable of rotating and so as to be capable of sliding in the axial direction. Spline teeth (not shown) that are capable of meshing with dog teeth (not shown) of a dog gear (second dog gear) 13$a$3 secured to the driven gear 13$a$2 are provided on a diameter-direction inner side of the low-gear stage clutch sleeve 15$b$. When the low-gear stage clutch sleeve 15$b$ of the low-gear stage clutch 15 is at a right-side engagement position (right), the spline teeth of the low-gear stage clutch sleeve 15$b$ and the dog teeth of the dog gear 13$a$3 mesh with each other, whereby the driven gear 13$a$2 and the countershaft 12$b$ are coupled. However, when the low-gear stage clutch sleeve 15$b$ is at a left-side release position (left), the spline teeth of the low-gear stage clutch sleeve 15$b$ and the dog teeth of the dog gear 13$a$3 come out of mesh, whereby the driven gear 13$a$2 and the countershaft 12$b$ are uncoupled. Three planes P1, P2, P3 that extend in a direction orthogonal to the axis direction of the crankshaft 1$a$ are established. The planes P1, P2, P3 are parallel to each other. The first plane P1 and the second plane P2 are positioned on the right and left sides, respectively, and the third plane P3 is positioned between the first plane P1 and the second plane P2. The electric-power-generating-motor gear train 7, the low-gear stage gear train 13, and the travel-motor reduction mechanism 9 are disposed on the first plane P1. The high-gear stage gear train 12 and the differential 10 are disposed on the second plane P2. (The sleeves of) the high-gear stage clutch 14, the low-gear stage clutch 15, and the motor-travel clutch 8 are disposed on the third plane P3.

In the vehicle in the first embodiment, engaging the motor-travel clutch 8 and releasing both of the high-gear stage clutch 14 and the low-gear stage clutch 15 effects travel under a series hybrid mode in which only the travel motor 3 is used as a motive power source for travel and the engine 1 is used as a motive power source for electric power generation. In addition, releasing the motor-travel clutch 8 and selectively engaging one of the high-gear stage clutch 14 and the low-gear stage clutch 15 effects travel under an engine direct coupling mode in which only the engine 1 is used as a motive power source for travel. The engine transmission mechanism 11 either reaches a high-gear stage due to engagement of the high-gear stage clutch 14 or reaches a low-gear stage due to engagement of the low-gear stage clutch 15. In the vehicle in the first embodiment, engaging the motor-travel clutch 8 in a state where one of the high-gear stage clutch 14 and the low-gear stage clutch 15 has been engaged enables travel in a parallel hybrid mode.

Figure 2:
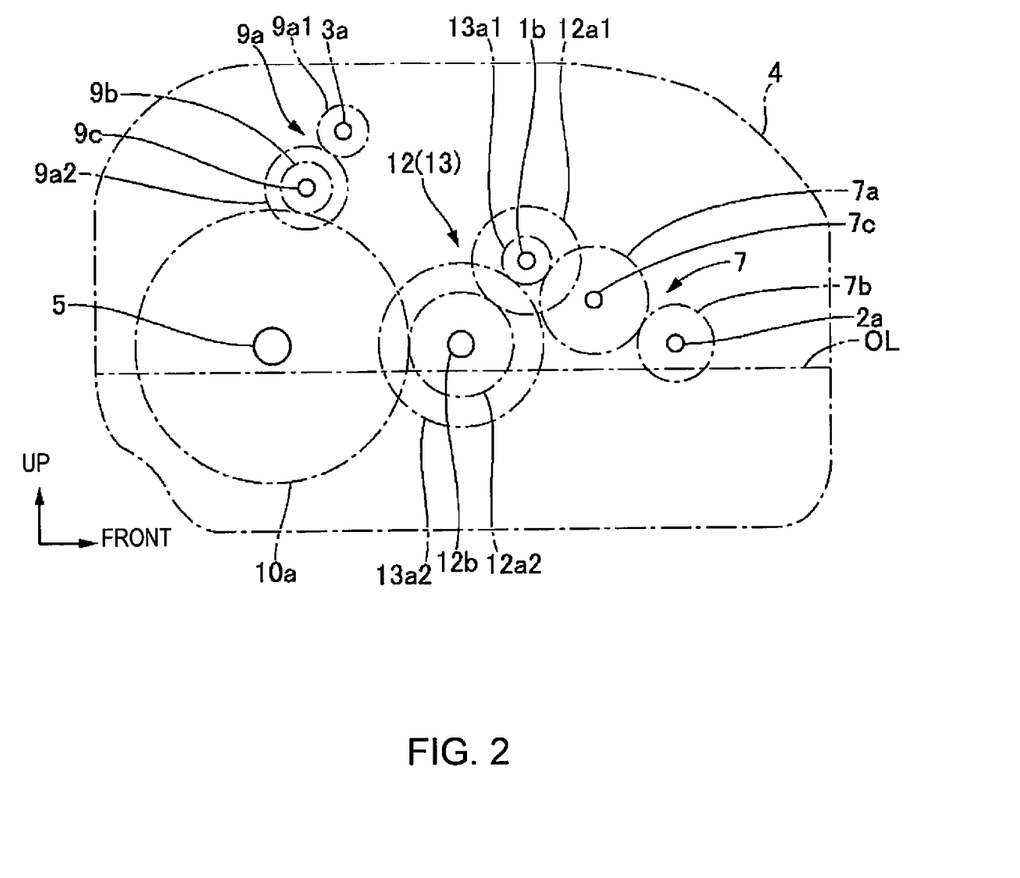
FIG. 2 is a schematic diagram in which gears in the first embodiment are viewed from an axial direction.

FIG. 2 is a schematic diagram in which gears in the first embodiment are viewed from an axial direction. The rotation shafts of the gears, specifically the motor shaft 2$a$, the rotating shaft 7$c$, the input shaft 1$b$, the countershaft 12$b$, the motor shaft 3$a$, the rotating shaft 9$c$, and the driveshaft 5, are lined up in the stated order from the front side of the vehicle. The high-gear stage gear train 12 and the low-gear stage gear train 13 of the engine transmission mechanism 11 are disposed between the electric-power-generating-motor gear train 7 and the ring gear 10$a$ in the vehicle longitudinal direction. The travel-motor gear train 9$a$ is disposed above the ring gear 10$a$ respect to the vertical direction. The lowermost ends of the driven gear 7$b$ respect to the vertical direction, the ring gear 10$a$, the driven gear 12$a$2, and the driven gear 13$a$2 are positioned lower than an oil surface OL of lubricating oil that is retained in a lower section of the gear box 4 with respect to the vertical direction. The oil surface OL is set at a height at which the lower sections of the driven gear 7$b$ with respect to the vertical direction, the ring gear 10$a$, the driven gear 12$a$2, and the driven gear 13$a$2 are continuously submerged. The drive gear 7$a$, the drive gear 9$a$1, the driven gear 9$a$2, the travel-motor final reduction gear 9$b$, the drive gear 12$a$1, and the drive gear 13$a$1 are lubricated by lubricating oil that has been thrust upward in the vertical direction due to rotation of the driven gear 7$b$, the ring gear 10$a$, the driven gear 12$a$2, and the driven gear 13$a$2.

Figure 3:
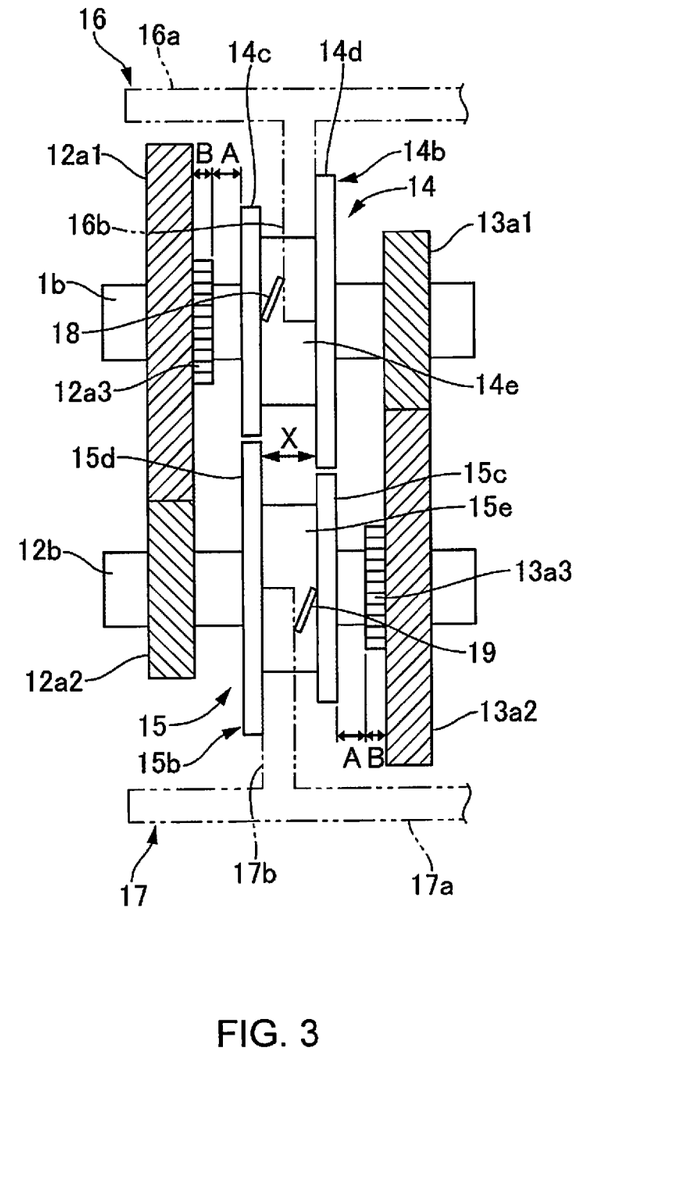
FIG. 3 is a schematic diagram in which an engine transmission mechanism in the first embodiment is viewed from an axis-orthogonal direction.
Figure 4:
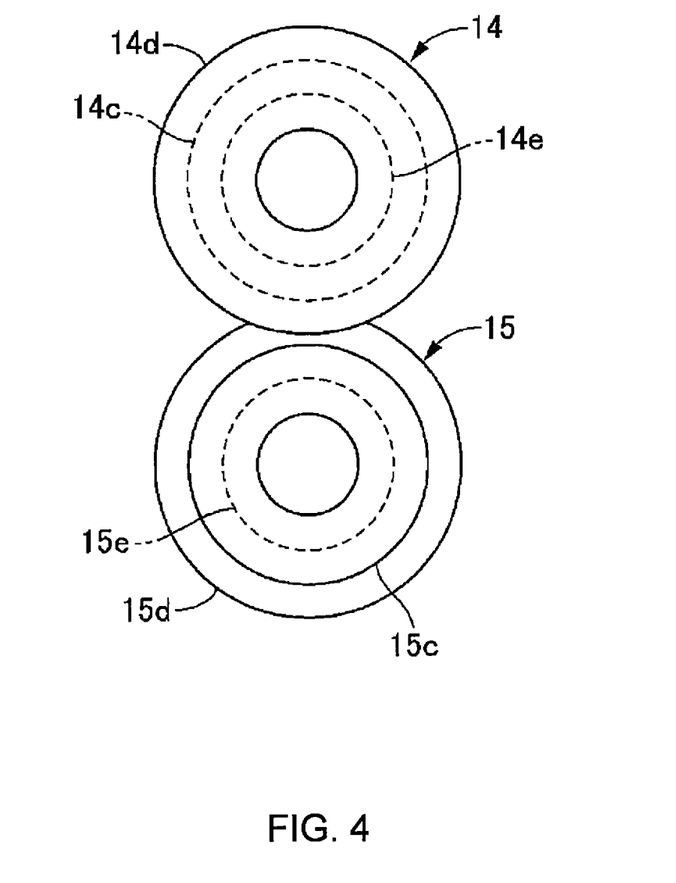
FIG. 4 is a schematic diagram in which a high-gear stage clutch sleeve and a low-gear stage clutch sleeve in the first embodiment are viewed from an axial direction.

FIG. 3 is a schematic diagram in which the engine transmission mechanism 11 in the first embodiment is viewed from an axis-orthogonal direction, and FIG. 4 is a schematic diagram in which the high-gear stage clutch sleeve 14$b$ and the low-gear stage clutch sleeve 15$b$ in the first embodiment are viewed from an axial direction. The high-gear stage clutch sleeve 14$b$ has two flange parts 14$c$, 14$d$ and a shift fork groove 14$e$. The two flange parts 14$c$, 14d are provided at two axial-direction ends. The large-diameter flange part (first flange part) 14d that is located on a side closer to the drive gear 13a1, in the axial direction, is set so as to have a greater diameter than the small-diameter flange part 14c that is located on a side closer to the drive gear 12a1. The shift fork groove 14e is positioned between the two flange parts 14c, 14d in the axial direction. The shift fork groove 14e is set so as to have a smaller diameter than the small-diameter flange part 14c. Thrust is applied to the high-gear stage clutch sleeve 14b by a high-gear stage shift actuator (first actuator) 16, and the high-gear stage clutch sleeve 14b moves in the axial direction through a region from the right-side release position shown in FIG. 3 to the left-side engagement position at which the small-diameter flange part 14c comes into contact with the drive gear 12a1. The high-gear stage shift actuator 16 has a shift rod 16a and a shift fork 16b. The shift rod 16a is a rod-form body extending in the axial direction and moves in the axial direction in accordance with a command from a controller (not shown). The shift fork 16b protrudes in a forked shape from the shift rod 16a and fits into the shift fork groove 14e in the high-gear stage clutch sleeve 14b.

A standby spring (first deflection spring) 18 is interposed between the shift fork 16b and the small-diameter flange part 14c in the axial direction. The standby spring 18 is disposed so as to be capable of propagating thrust applied from the shift fork 16b to the small-diameter flange part 14c. When the shift fork 16b moves toward an interlocking direction (direction approaching the drive gear 12a1), the standby spring 18 flexurally deforms in response to application of the thrust from the shift fork 16b. Pressing force is thereby applied to the high-gear stage clutch sleeve 14b, and interlocking-direction movement of the high-gear stage clutch sleeve 14b is deferred. Specifically, the standby spring 18 is a standby mechanism in which a spring component is used, where the standby mechanism: accumulates thrust applied from the shift fork 16b and holds off interlocking-direction movement of the high-gear stage clutch sleeve 14b until a phase of the spline teeth of the high-gear stage clutch sleeve 14b matches a phase of the dog teeth of the dog gear 12a3; and, when the phase of the spline teeth of the high-gear stage clutch sleeve 14b and that of the dog teeth of the dog gear 12a3 have matched, causes the high-gear stage clutch sleeve 14b to move in the interlocking direction.

The low-gear stage clutch sleeve 15b has two flange parts 15c, 15d and a shift fork groove 15e. The two flange parts 15c, 15d are provided at two axial-direction ends. The large-diameter flange part (second flange part) 15d that is located on a side closer to the driven gear 12a2, in the axial direction, is set so as to have a greater diameter than the small-diameter flange part 15c that is located on a side closer to the driven gear 13a2. The shift fork groove 15e is positioned between the two flange parts 15c, 15d in the axial direction. The shift fork groove 15e is set so as to have a smaller diameter than the small-diameter flange part 15c. Thrust is applied to the low-gear stage clutch sleeve 15b by a low-gear stage shift actuator (second actuator) 17, and the position of the low-gear stage clutch sleeve 15b moves in the axial direction through a region from the left-side release position shown in FIG. 3 to the right-side engagement position at which the small-diameter flange part 15c comes into contact with the driven gear 13a2. The low-gear stage shift actuator 17 has a shift rod 17a and a shift fork 17b. The shift rod 17a is a rod-form body extending in the axial direction and moves in the axial direction in accordance with a command from a controller (not shown). The shift fork 17b protrudes in a forked shape from the shift rod 17a and fits into the shift fork groove 15e in the low-gear stage clutch sleeve 15b. A standby spring (second deflection spring) 19 is interposed between the shift fork 17b and the small-diameter flange part 15c in the axial direction. The standby spring 19 is disposed so as to be capable of propagating thrust applied from the shift fork 17b to the small-diameter flange part 15c. The function of the standby spring 19 is identical to that of the standby spring 18, and therefore a detailed description of this function is omitted.

Outer-peripheral-side portions of the large-diameter flange part 14d of the high-gear stage clutch sleeve 14b and the large-diameter flange part 15d of the low-gear stage clutch sleeve 15b overlap as viewed from the axial direction, as shown in FIG. 4. However, the large-diameter flange part 14d of the high-gear stage clutch sleeve 14b and the small-diameter flange part 15c of the low-gear stage clutch sleeve 15b do not overlap in the axial direction. Similarly, the small-diameter flange part 14c of the high-gear stage clutch sleeve 14b and the large-diameter flange part 15d of the low-gear stage clutch sleeve 15b do not overlap in the axial direction. In addition, the following expression (1) is satisfied, where x is an axial-direction distance between the two large-diameter flange parts 14d, 15d (distance between two large-diameter flange parts) when the two clutch sleeves 14b, 15b are both at release positions, A is an axial-direction distance from the large-diameter flange part 14d to the dog gear 12a3 and an axial-direction distance from the large-diameter flange part 15d to the dog gear 13a3, and B is an axial-direction length of the two dog gears 12a3, 13a3 (distance from distal end to root).

$$A+B<x<2A+B \qquad \text{Expression (1)}$$

Thus, in cases where one of the two clutch sleeves 14b, 15b has moved from the release position in a direction toward the engagement position when the other of the two clutch sleeves 14b, 15b is at the engagement position, the two large-diameter flange parts 14d, 15d come into contact with each other before the one clutch sleeve arrives at the engagement position, whereby movement of the one clutch sleeve toward the engagement position is restricted. Specifically, when one of the two clutch sleeves 14b, 15b is at the engagement position, the two large-diameter flange parts 14d, 15d function as an interference member that interferes so that the other of the two clutch sleeves 14b, 15b cannot move to the engagement position.

Figure 5:
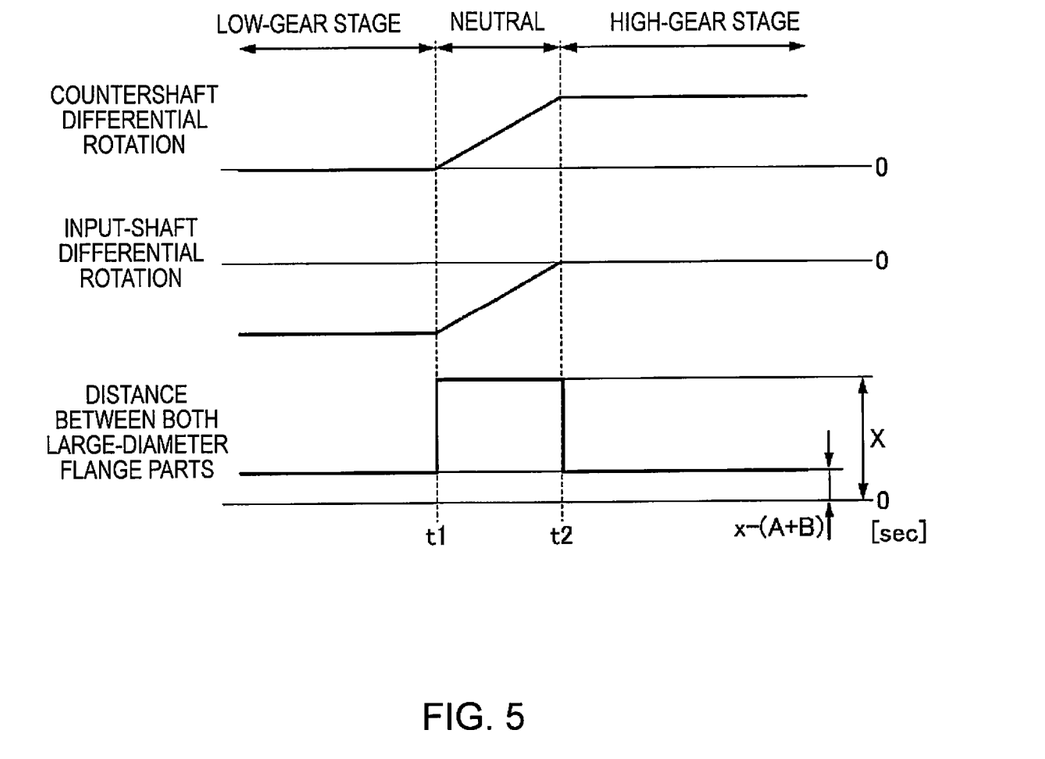
FIG. 5 is a time chart showing countershaft differential rotation, input-shaft differential rotation, and a distance between two large-diameter flange parts when the engine transmission mechanism is switched from a low-gear stage to a high-gear stage.
Figure 6:
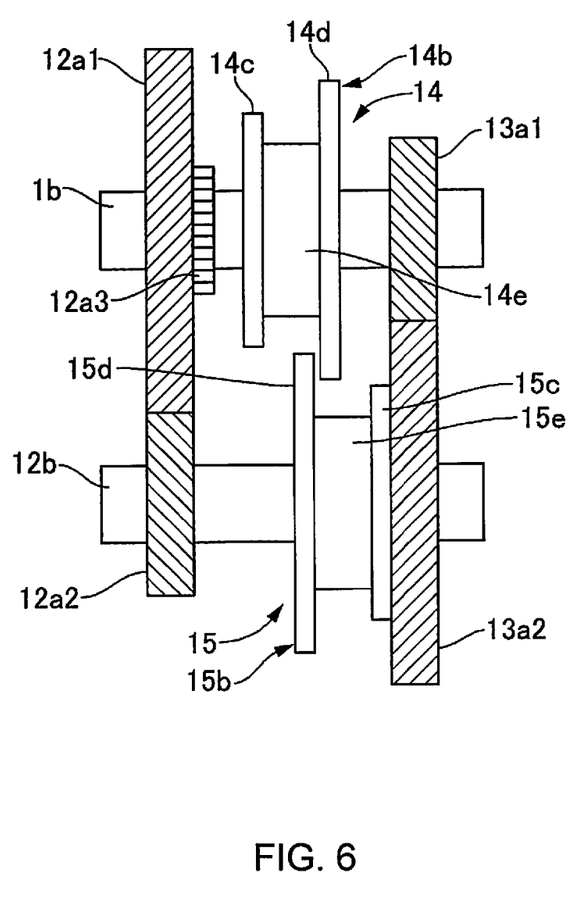
FIG. 6 is a schematic diagram of the low-gear stage in the engine transmission mechanism.

Effects of the first embodiment are described next. FIG. 5 is a time chart showing countershaft differential rotation, input-shaft differential rotation, and a distance between the two large-diameter flange parts when the engine transmission mechanism 11 is switched from a low-gear stage to a high-gear stage. In an interval until a time t1, the low-gear stage clutch 15 is in an engaged state, as shown in FIG. 6. At this time, because the dog gear 13a3 rotates integrally with the low-gear stage clutch sleeve 15b, the countershaft differential rotation, which is the difference in rotation speed between the low-gear stage clutch sleeve 15b and the dog gear 13a3, is zero. Because the high-gear stage clutch 14 is in a released state, the dog gear 12a3 is stopped. Therefore, a fixed difference in rotation speed (input-shaft differential rotation) arises between the high-gear stage clutch sleeve 14b and the dog gear 12a3. In addition, because the low-gear stage clutch sleeve 15b is at the right-side engagement position and the high-gear stage clutch sleeve 14b is at the right-side release position, the distance between the two large-diameter flange parts is x−(A+B).

At time t1, because the high-gear stage is selected due to a driver or a travel state (e.g., speed), the controller drives the low-gear stage shift actuator 17 and causes the low-gear stage clutch sleeve 15b to move from the right-side engagement position to the left-side release position. The spline teeth of the low-gear stage clutch sleeve 15b and the dog teeth of the dog gear 13a3 thereby come out of mesh, and the low-gear stage clutch 15 enters a released state. Because the two clutch sleeves 14b, 15b are both at the release position, the distance between the two large-diameter flange parts reaches x (refer to FIG. 3). In addition, the speed of the electric-power-generating motor 2 is controlled so that the input-shaft differential rotation is minimized, whereby rotation of the high-gear stage clutch sleeve 14b and that of the dog gear 12a3 is synchronized. Thus, the input-shaft differential rotation is gradually decreased and the countershaft differential rotation is gradually increased in an interval from time t1 to a time t2.

Figure 7:
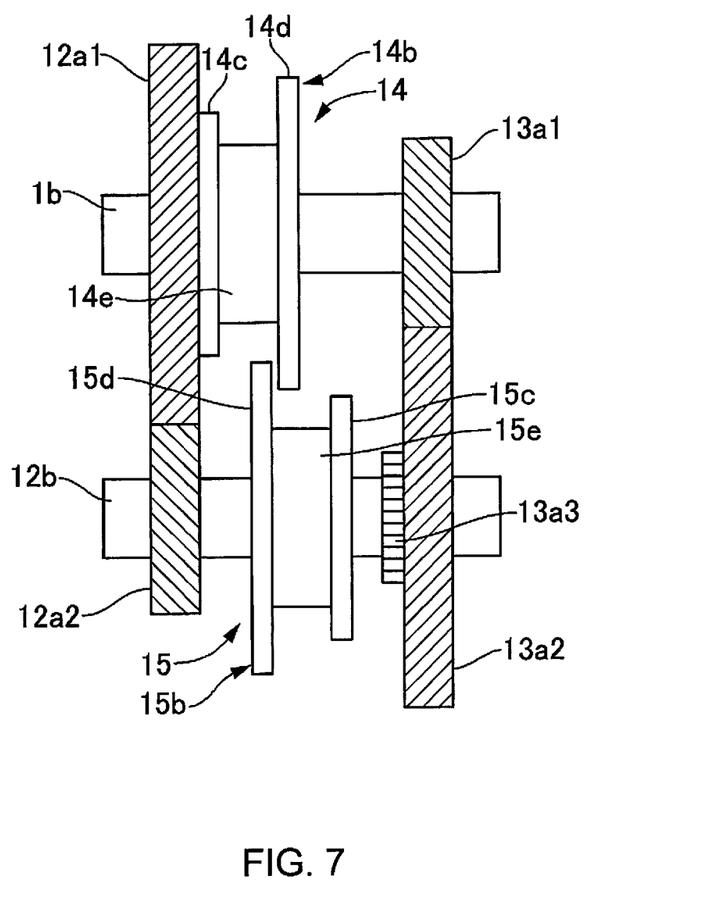
FIG. 7 is a schematic diagram of the high-gear stage in the engine transmission mechanism.

At time t2, because the input-shaft differential rotation has been minimized, the controller drives the high-gear stage shift actuator 16 and causes the high-gear stage clutch sleeve 14b to move from the release position to the engagement position. The spline teeth of the high-gear stage clutch sleeve 14b and the dog teeth of the dog gear 13a3 thereby come out of mesh, and the high-gear stage clutch 14 enters an engaged state. At this time, because the low-gear stage clutch sleeve 15b is at the left-side release position and the high-gear stage clutch sleeve 14b is at the left-side engagement position, as shown in FIG. 7, the distance between the two large-diameter flange parts reaches x−(A+B).

As described above, the engine transmission mechanism 11 in the first embodiment is provided with an interference member (large-diameter flange parts 14d, 15d) that interfere so that, when one of the low-gear stage clutch sleeve 15b and the high-gear stage clutch sleeve 14b is at an engagement position, the other cannot move to an engagement position. Therefore, when, for example, the low-gear stage clutch 15 is in an engaged state, the large-diameter flange part 15d interferes with the large-diameter flange part 14d before the spline teeth of the high-gear stage clutch sleeve 14b and the dog teeth of the dog gear 13a3 mesh, and movement of the high-gear stage clutch sleeve 14b toward the left-side engagement position is restricted, even when thrust is applied to the high-gear stage clutch sleeve 14b due to erroneous actuation of the high-gear stage shift actuator 16. This makes it possible to avoid a circumstance where the high-gear stage clutch 14 enters an engaged state and to prevent the occurrence of unexpected interlocking. As a result, sudden changes in behavior of the vehicle caused by the occurrence of interlocking can be suppressed.

The interference member includes the large-diameter flange part 14d provided to the high-gear stage clutch sleeve 14b and the large-diameter flange part 15d provided to the low-gear stage clutch sleeve 15b. The two large-diameter flange parts 14d, 15d have shapes that overlap as viewed from the axial direction. Specifically, providing the interference member to the two clutch sleeves 14b, 15b makes it possible to simplify the structure of the interference member and to reduce the number of components to a greater extent than in cases where interference member is provided separately.

The expression A+B<x<2A+B is satisfied, where x is an axial-direction distance between the large-diameter flange part 14d and the large-diameter flange part 15d when the high-gear stage clutch sleeve 14b and the low-gear stage clutch sleeve 15b are both at release positions, A is an axial-direction distance from the high-gear stage clutch sleeve 14b to the dog gear 12a3 and an axial-direction distance from the low-gear stage clutch sleeve 15b to the dog gear 13a3, and B is an axial-direction length of the dog gear 12a3 and the dog gear 13a3. Setting x so as to be longer than A+B makes it possible for one clutch sleeve to reliably move to the engagement position from a state where the high-gear stage clutch sleeve 14b and the low-gear stage clutch sleeve 15b are both at the release positions. Specifically, the low-gear stage or the high-gear stage can be reliably selected. In addition, setting x so as to be shorter than 2A+B makes it possible, when one of the low-gear stage clutch sleeve 15b and the high-gear stage clutch sleeve 14b reaches the engagement position, for the amount by which the other clutch sleeve can move toward the engagement position to be less than A, and makes it possible to avoid interlocking of the other clutch sleeve and the dog gear. As a result, incidence of unexpected interlocking can be more reliably prevented.

The engine transmission mechanism 11 is provided with: the high-gear stage shift actuator 16, which applies thrust to the high-gear stage clutch 14; the low-gear stage shift actuator 17, which applies thrust to the low-gear stage clutch 15; the standby spring 18, which is disposed so as to transmit thrust between the high-gear stage clutch sleeve 14b and the high-gear stage shift actuator 16 and which flexurally deforms in response to application of the thrust from the high-gear stage shift actuator 16; and the standby spring 19, which is disposed so as to transmit thrust between the low-gear stage clutch sleeve 15b and the low-gear stage shift actuator 17 and which flexurally deforms in response to application of the thrust from the low-gear stage shift actuator 17. In a transmission mechanism in which selectively engaging two dog clutches that are independent from each other enables switching between two gear stages, during switching between gear stages in cases where dog clutches having standby springs are employed, there are situations where an interlocking state of dog gears is maintained by extension or retraction of the standby springs even when, in a release-side dog clutch, a shift actuator is moved from a position that corresponds to an engagement position of a clutch sleeve to a position that corresponds to a release position thereof, and interlocking readily occurs. However, in the engine transmission mechanism 11 in the first embodiment, even in cases where a state of interlocking with the dog gear 12a3 or the dog gear 13a3 is maintained for one of the high-gear stage clutch sleeve 14b and the low-gear stage clutch sleeve 15b due to extension of the standby spring 18 or the standby spring 19, the one clutch sleeve is reliably returned to the release position due to the interference of the two large-diameter flange parts 14d, 15d when the other clutch sleeve moves to the engagement position. This makes it possible to more reliably prevent incidence of unexpected interlocking.

Other Embodiments

A mode for carrying out the present invention has been described above on the basis of the embodiment, but the specific configuration of the present invention is not limited to this embodiment; design changes, etc., that do not depart from the scope of the invention are also included in the present invention. For example, the interference member may be separate elements from the first clutch sleeve and the second clutch sleeve.

The invention claimed is:
1. A vehicle transmission comprising:
a first gear rotatably supported on a first shaft;
a second gear secured to a second shaft and continuously meshed with the first gear;

a first clutch sleeve that rotates integrally with the first shaft and that moves along an axial direction between a release position and an engagement position for interlocking with a first dog gear of the first gear;

a third gear secured to the first shaft;

a fourth gear rotatably supported on the second shaft and continuously meshed with the third gear; and a second clutch sleeve that rotates integrally with the second shaft and that moves along the axial direction between a release position and an engagement position for interlocking with a second dog gear of the fourth gear, a portion of the first clutch sleeve and a portion of the second clutch sleeve being arranged and configured to interfere with each other so that when one of the first clutch sleeve and the second clutch sleeve is at the engagement position, the other of the first clutch sleeve and the second clutch sleeve cannot move to the engagement position.

2. The vehicle transmission according to claim 1, wherein the portion of the first clutch sleeve is a first flange part of the first clutch sleeve and the portion of the second clutch sleeve is a second flange part of the second clutch sleeve, and the first flange part and the second flange part have shapes that overlap as viewed along the axial direction.

3. The vehicle transmission according to claim 2, wherein the first dog gear, the second dog gear, the first clutch sleeve and the second clutch sleeve, the first flange part and the second flange part, are configured and arranged with respect to satisfy a following relationship $$A+B<x<2A+B$$

where x is an axial-direction distance between the first flange part and the second flange part when the first clutch sleeve and the second clutch sleeve are both at the release positions, A is an axial-direction distance from the first clutch sleeve to the first dog gear and an axial-direction distance from the second clutch sleeve to the second dog gear, and B is an axial-direction length of the first dog gear and the second dog gear.

4. The vehicle transmission according to claim 3, further comprising:

a first actuator configured to apply thrust to the first clutch sleeve;

a second actuator configured to apply thrust to the second clutch sleeve;

a first deflection spring disposed to transmit thrust between the first clutch sleeve and the first actuator, the first deflection spring flexing and deforming in response to application of the thrust from the first actuator; and a second deflection spring disposed to transmit thrust between the second clutch sleeve and the second actuator, the second deflection spring flexing and deforming in response to application of the thrust from the second actuator.

5. The vehicle transmission according to claim 2, further comprising:

a first actuator configured to apply thrust to the first clutch sleeve;

a second actuator configured to apply thrust to the second clutch sleeve;

a first deflection spring disposed to transmit thrust between the first clutch sleeve and the first actuator, the first deflection spring flexing and deforming in response to application of the thrust from the first actuator; and a second deflection spring disposed to transmit thrust between the second clutch sleeve and the second actuator, the second deflection spring flexing and deforming in response to application of the thrust from the second actuator.

6. The vehicle transmission according to claim 1, further comprising:

a first actuator configured to apply thrust to the first clutch sleeve;

a second actuator configured to apply thrust to the second clutch sleeve;

a first deflection spring disposed to transmit thrust between the first clutch sleeve and the first actuator, the first deflection spring flexing and deforming in response to application of the thrust from the first actuator; and a second deflection spring disposed to transmit thrust between the second clutch sleeve and the second actuator, the second deflection spring flexing and deforming in response to application of the thrust from the second actuator.

7. The vehicle transmission according to claim 1, wherein the portion of the first clutch sleeve and the portion of the second clutch sleeve are arranged and configured such that when the one of the first clutch sleeve and the second clutch sleeve is at the engagement position, the other of the first clutch sleeve and the second clutch sleeve cannot move to the engagement position because the portion of the first clutch sleeve and the portion of the second clutch sleeve will come into contact with each other before the other of the first clutch sleeve and the second clutch sleeve arrives at the engagement position.

8. The vehicle transmission according to claim 1, wherein the first clutch sleeve moves in a first axial direction from the release position and to the engagement position, and the second clutch sleeve moves in a second axial direction from the release position and the engagement position, the first axial direction being opposite the second axial direction.

* * * * *